Figure 1:
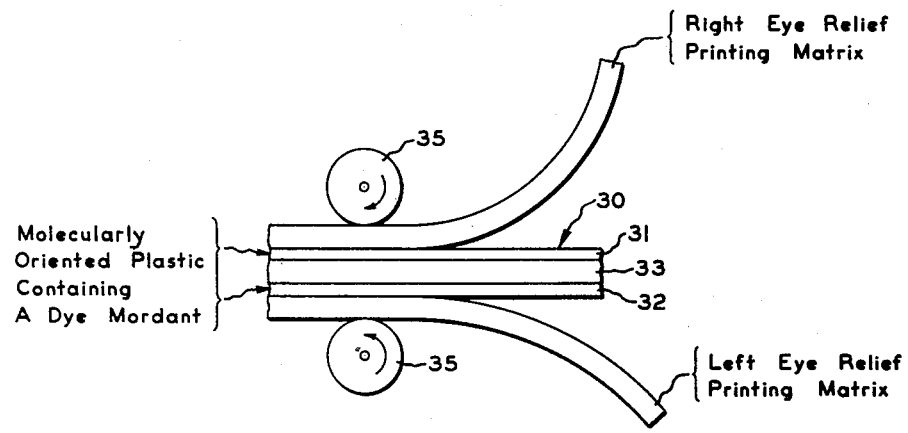

United States Patent Office 2,931,272
Patented Apr. 5, 1960

2,931,272

SHEET STOCK FOR DICHROIC DYE LIGHT-POLARIZING MEANS

Howard C. Haas, Arlington, Mass., assignor to Polaroid Corporation, Cambridge, Mass., a corporation of Delaware Application August 3, 1955, Serial No. 526,302

15 Claims. (Cl. 88—65)

This invention relates to improvements in sheet stock of the character rendered light polarizing by the incorporation therein of one or more dichroic dyes, and especially sheet stock in the form of photographic film adapted to carry light-polarizing dichroic dye images, as well as to improved products resulting from the predetermined dyeing of sheet stock of the nature described whereby to render the stock light polarizing wherever dye is present therein.

Objects of the invention are to provide improved sheet stock, especially sheet stock in the form of motion picture and cut film, for the reception of dichroic dyes and comprising one or more layers of an orientable, dyeable, transparent, high molecular weight, hydroxyl-containing, vinyl polymer which has the molecules thereof highly oriented in a predetermined direction and in which there is incorporated, as a dye mordant or fixing agent, a basic nitrogen-containing polyamide or nylon, commonly referred to as a basic nylon, for example, a nylon containing secondary and/or tertiary amino groups.

Other objects of the invention are to provide sheet stock products, especially in the form of film stock, comprising a support carrying thereon a dyeable layer of an image-receptive material comprising a sheet of an oriented, plastic polymer of the character described and in which there is incorporated a substantially uniform distribution of a basic nylon as a dye mordant; to provide a product having a transparent support carrying a pair of image-receptive layers, especially on opposite sides of said support, and which comprises sheets of an orientable polymer of the character described which have a basic nylon incorporated therein as a dye mordant and which are in molecularly oriented condition so that the direction of orientation of the molecules of one of said layers is at 90° to the direction of orientation of the molecules of the other image-bearing layer whereby to provide film stock useful for forming light-polarizing stereoscopic image pairs thereon and comprising dye images.

Further objects of the invention are to provide a light-polarizing product especially of the photographic type and comprising at least one layer of a transparent, high molecular weight, hydroxyl-containing, vinyl polymer having the molecules thereof predeterminedly oriented and including a substantially uniform distribution of a basic nylon as a dye mordant therein, together with at least one dichroic dye held fast in said layer by said mordant and rendering said layer, wherever present, light polarizing, and especially a product wherein said dye is differentially dispersed to provide a photographic image of a light-polarizing nature; and to provide products of the character just described, including multicolor images formed of appropriately colored dichroic dyes and especially such products which carry one or more stereoscopic pairs of dichroic dye images.

Other objects of the invention will in part be obvious and will in part appear hereinafter.

Figure 2:
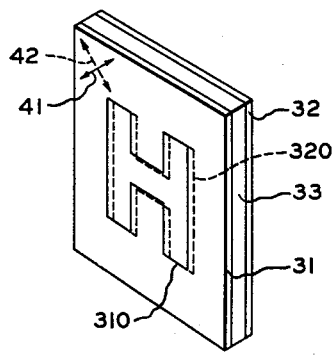

For a fuller understanding of the nature and objects of the invention, reference should be had to the following detailed description taken in connection with the accompanying drawing wherein:

Figure 1 is a diagrammatic illustration showing the manner of forming pairs of superposed light-polarizing stereoscopic dye images in stereoscopic film stock by the application to each side of the film stock of a printing matrix which contains, as a relief image, one of a stereoscopic pair of images to be printed and which is wet with a dichroic dye; and Fig. 2 is a diagrammatic perspective view of a stereoscopic color print produced on the stereoscopic film stock by the procedure illustrated in Fig. 1.

One practice for producing a light polarizer is to adsorb a dichroic dye in a transparent, molecularly oriented, linear, high molecular weight, hydroxyl-containing, vinyl polymer of which a preferred example is polyvinyl alcohol. Wherever a dichroic dye is adsorbed in a molecularly oriented plastic sheet of this nature, it renders the sheet light polarizing. Oriented plastic materials of the character described are useful to provide dye polarizers and are particularly suited as a medium for providing stereoscopic, light-polarizing prints in color.

While dye mordants have in the past been dispersed or incorporated in a wide variety of dyeable materials to assist in the dyeing thereof, it has only recently been discovered that certain types of mordants may be added to a linear, high molecular weight, hydroxyl-containing, vinyl polymer substantially without effect upon the orientation properties of the polymer whereby to provide a product of good optical homogeneity useful as stock capable of being rendered light polarizing where dyed with a dichroic dye and comprising a sheet of said polymer in which the molecules thereof are in a high state of molecular orientation as a result of the stretching of said sheet and in which a dye mordant is substantially uniformly distributed.

A dye mordant which is distributed in a molecularly oriented plastic sheet provides an effective mechanism for assuring the faithful reproduction in an image printed on the sheet of the resolution of a matrix image contained in a washoff relief printing matrix in instances where an aqueous solution of a dichroic dye absorbed into said printing matrix is penetrated into said sheet by preferential transfer thereto from the printing matrix which is pressed into contact therewith. Also, a dye mordant dispersed in a molecularly oriented plastic sheet is an effective mechanism for assuring that dye, in a quantity sufficient to give a desired dye density of high order, is penetrated into the sheet wherever an aqueous solution of said dye is contacted with said sheet to carry out the dyeing thereof.

In regard to the term "dye mordant" or "mordant," it is recognized that "A substance which holds the dye in place is called a mordant." Page 268, "Principles of Color Photography" (1953), by Ralph M. Evans, W. T. Hanson, Jr. and W. Lyle Brewer, John Wiley and Sons, Inc., New York; and by the use of the term "dye mordant" or "mordant" in the specification and claims hereof, there is meant a substance of the nature just described.

Until quite recently, the incorporation of a dye mordant in molecularly oriented sheet stock of the character used in the formation of dichroic dye polarizer means has been unknown, the first disclosure of a product of such nature appearing in the copending application of William H. Ryan and Vivian K. Walworth, Serial No. 444,074, filed July 19, 1954, now Patent No. 2,868,077, issued Jan. 13, 1959.

The just-mentioned application discloses and claims, in conjunction with molecularly oriented plastic sheet and as dye mordants suitable for incorporation therein, substances which are generically characterized as falling within the class of organic compounds which contain basic nitrogen. The present invention is concerned with products comprising molecularly oriented layers or sheets of transparent, high molecular weight, hydroxyl-containing, vinyl polymers such as polyvinyl alcohol wherein there is included as a dye mordant a substance chosen from and limited to a subgroup of the generic class of mordants named in said application and restricted to a subgroup which is not specifically described in said application and which embraces basic nitrogen-containing polyamides or basic nylons, examples of which comprise nylons having one or more secondary and/or tertiary amino groups.

Basic nylons may be prepared by any well known practice. One common procedure for the preparation of a basic nylon is by carrying out a condensation reaction between a dibasic acid or derivative thereof and a diamine or polyamine, as follows:

(1) By the reaction of a dibasic acid containing no basic nitrogen with (a) A polyamine having terminal primary amino groups and one or more secondary and/or tertiary amino groups, or (b) A polyamine having terminal secondary amino groups and one or more tertiary amino groups, or (c) A polyamine having one terminal primary amino group, one terminal secondary amino group and one or more tertiary amino groups;

(2) By the reaction of a dibasic acid having one or more secondary amino groups and (a) A polyamine having terminal primary amino groups, or (b) A polyamine having terminal primary amino groups and one or more secondary and/or tertiary amino groups; and (3) By the reaction of a dibasic acid having one or more tertiary amino groups and (a) A polyamine having terminal primary amino groups, or (b) A polyamine having terminal primary amino groups and one or more secondary and/or tertiary amino groups, or (c) A polyamine having one terminal primary amino group and one terminal secondary amino group, or (d) A polyamine having one terminal primary amino group, one terminal secondary amino group and one or more tertiary amino groups, or (e) A polyamine having two terminal secondary amino groups, or (f) A polyamine having two terminal secondary amino groups and one or more tertiary amino groups.

While dibasic acids have been specifically mentioned, it will be recognized that reactions of the nature just described may be carried out with the ester or other suitable derivative of the free acids listed.

These and other procedures for preparing basic nylons of the character employed in the practice of this invention are set forth in U.S. Patents Nos. 2,274,831 and 2,483,514 and in British No. 610,311.

To name some specific compounds which fall within the broad meaning of basic nylon mordants, mention is made of a nylon made from hexamethylene pentamethylene triamine and sebacic acid; a nylon made from sebacic acid and tetraethylene pentamine; a nylon made from sebacic acid and diethylene triamine; a nylon made from adipic acid and 1,2-bis ω-aminohexyl-aminoethane; the reaction product of 6.6 nylon and adipic dihydrazide; a nylon made from adipic acid and equal parts hexamethylene diamine and diethylene triamine; a nylon made from adipic acid and diethylene triamine; a nylon made from hexyl-pentyl methylene triamine with adipic acid; a nylon made from dipropylene triamine with adipic acid; and a nylon made from adipic acid and 3,3'-imino-bis-propylamine.

Certain properties possessed by the basic nylons with which this invention is concerned make these compounds highly desirable as mordants for distribution in oriented plastic sheets such as polyvinyl alcohol. While, in general, basic nylons are water insoluble they are easily dissolved in weak aqueous solutions of an alcohol such as methanol or ethanol and/or in weak acids such as acetic acid or formic acid or in an aqueous solution of both an alcohol and an acid of the character just mentioned. These solvents are penetrable into and compatible with organic plastics of the nature of polyvinyl alcohol and provide an effective vehicle for incorporating a basic nylon mordant into cast sheet as by contact of the mordant with the sheet, as well as a means for incorporating the mordant in a casting composition from which the sheet is formed.

Additionally important properties of the basic nitrogen-containing nylons reside in the fact that they are, in general, highly transparent and are sufficiently compatible with hydroxyl-containing, vinyl polymers which comprise the plastic sheet products to make it possible to provide sheet products which possess adequate optical homogeneity while including a dye mordant as an additive in the product. Furthermore, it may be stated that a basic nylon present in an unoriented plastic sheet remains substantially unaffected upon stretching the sheet to orient the sheet molecules and seems to exert no appreciable effect upon the sheet itself during said stretching whereby the optical homogeneity of the sheet remains substantially unimpaired.

Basic nylons in general are of large molecule size and in this regard basic nylons with larger sized molecules are preferred as mordants. At the same time, all mordant compounds of this type display good substantivity to hydroxyl-containing vinyl polymers. Thus, basic nylons, when incorporated in plastic sheet of the character with which this invention is concerned, are in general immobilized in the sheet, at least to an extent sufficient to prevent their complete removal therefrom by being washed out of the sheet in aqueous processing solutions employed in the predetermined dyeing of the sheet.

Some explanation of the nature of the molecularly oriented sheet stock and the manner of rendering the same light polarizing by the predetermined application of dichroic dyes to the stock here seems desirable for a fuller understanding of the invention.

In this regard, a suitable medium in which superposed, light-polarizing, stereoscopic left- and right-eye images may be formed is provided by the stereoscopic film stock or printing blank 30 illustrated in Fig. 1 as comprising a laminar structure having two thin and transparent surface layers 31 and 32 mounted upon the opposite sides of a transparent support 33. The surface layers 31 and 32 are thin sheets of a transparent, molecularly oriented, high molecular weight, hydroxyl-containing, vinyl polymer of which a preferred example is polyvinyl alcohol, while the support 33 is any suitable transparent and substantially water-impermeable plastic such as cellulose acetate butyrate or cellulose triacetate.

Preferably the layer 31 has its molecules so oriented that the transmission or polarizing axis of the layer will be at 45° to the edge of the film stock 30, while the layer 32 has its molecules so oriented that the transmission or polarizing axis of the layer will also be at 45° to the edge of the film stock but will make an angle of 90° with the transmission axis of the layer 31. This preferred orientation for film stock is indicated by the arrows 41 and 42 in Fig. 2 which schematically illustrates film stock 30 after image formation therein.

Film structures of this general nature are disclosed in U.S. Patents Nos. 2,289,714, 2,289,715 and 2,315,373. The film stock 30 provides a transparent structure useful as motion picture film or cut film. Additionally, the film stock 30 may be mounted upon an opaque, nonpolarizing, reflecting base and used for the formation of light-polarizing reflection prints. Stereoscopic image pairs formed in the film stock 30 will be located in superposed relation to each other.

Image formation in the film stock 30 is carried out by printing with washoff relief matrices. The washoff relief matrices are prepared from photographic originals or duplicates thereof by conventional practices and, after imbibition of a solution of dichroic dye therein, are pressed into contact with the outer faces of the layers 31 and 32 to transfer portions of said solution to each of said layers.

Two sets of printing matrices, one for the right-eye image and one for the left-eye image, are used for the positive reproduction of a stereoscopic pair of images. For color positives, each set of matrices comprises two individual relief matrices which each bears a positive color separation record of one image of the stereoscopic pair of images to be reproduced. The individual matrices in a set used for color reproduction are printed successively on the stereoscopic film stock, for example the matrices representative of the cyan, magenta and yellow components of the color image to be reproduced may be applied to the film stock in the order just named.

A convenient means for simultaneously printing on opposite sides of the film stock 30 is schematically illustrated in Fig. 1 wherein the film stock 30 with a right-eye printing matrix and a left-eye printing matrix superposed on opposite sides thereof is shown as being passed between two rotating pressure-applying rolls 35 which cause the matrices to be pressed into intimate contact with the outer molecularly oriented layers 31 and 32 of the film stock.

A print or product resulting from the utilization of the procedure illustrated in connection with Fig. 1 is diagrammatically shown in Fig. 2 wherein film stock 30 is illustrated as containing a right-eye stereoscopic image 310 in the molecularly oriented layer 31 and a left-eye stereoscopic image 320 in the molecularly oriented layer 32. Image 310 is shown in full lines while image 320 is shown in dotted lines. For the purposes of simplification, the print shown in Fig. 2 has been considered as derived from a pair of stereoscopic records of the letter H and, in accordance with the process heretofore described, may be considered as providing a full-color stereoscopic print.

Viewing is carried out by observing these light-polarizing images 310 and 320 through polarizing filters located in front of each eye of the observer with the transmission axes thereof positioned at 90° to each other. Additionally, the light-polarizing filters are so positioned with respect to the light-polarizing images in the film 30 that each has its respective polarizing axis crossed or at 90° to the polarizing axis of the image to be observed therethrough. In this way, each eye sees substantially only the image intended for it.

As has been intimated, the employment of the basic nylon mordants of this invention is not limited to their incorporation in molecularly oriented sheet stock in which a light-polarizing image is to be provided. Mordants of this type are useful in sheet stock which is to be rendered light polarizing all over, as for example, by imbibition into the sheet of a dichroic dye solution in which the sheet is immersed or which is otherwise applied to at least one surface of the sheet to uniformly wet the same as by being flowed or sprayed onto said surface. Sheet structures suitable for conversion into dichroic dye polarizers in general comprise a transparent support such as the support 33 to which is adhered a molecularly oriented sheet, as for example the sheet 31. Structures of this general nature and suitable for providing overall dichroic dye polarizers are disclosed in Patent No. 2,237,567, issued April 8, 1941.

The molecular orientation of a plastic sheet is customarily carried out by stretching the sheet in the presence of heat and by the application to the sheet of opposed tensional forces. As will be well understood, the result of such stretching is to cause orientation of the molecules of the sheet in a direction which is substantially parallel to direction of application of the opposed stretching forces.

The degree of stretching imparted to a plastic sheet is empirically measured by what is called the axial ratio which is a quantity determined by the ratio of the major axis to the minor axis of the ellipse appearing on the plastic sheet after it is stretched and derived as a result of the stretching of said sheet from a circle printed on the sheet before stretching. In general, the higher the axial ratio, the higher the efficiency of the sheet as a light polarizer. Axial ratios of the order of 3 and greater are of a nature suitable for providing molecularly oriented sheet of high orientation. Current production practices are consistently carried out to provide axial ratios of around 6 for molecularly oriented polyvinyl alcohol sheet. The present invention is concerned with molecularly oriented plastic sheet stock which has an axial ratio of, or higher than, the order just noted and in which a basic nitrogen-containing nylon is distributed.

The basic nylon mordant is incorporated in plastic sheet stock, such as the film stock 30, by imbibition therein or is incorporated in the plastic dope or casting composition adapted to provide the layers of the stock which are to be oriented. In instances where the mordant is included in the casting composition, the layers formed by the casting process are stretched and then laminated to a support.

The following examples will serve to set forth methods by which a basic nylon mordant, for example any one of the basic nylons heretofore specifically mentioned, may be incorporated in sheet stock of the character with which this invention is concerned.

*Example I*

A basic nylon mordant is dissolved in a suitable water-miscible solvent such as a 1% to 5% aqueous solution of formic or acetic acid and/or methanol or ethanol to provide a mordant containing liquid having a mordant concentration up to 10%. The solution of the mordant is substantially uniformly applied onto a surface of a molecularly oriented plastic layer such as the layers 31 and 32 of the film stock 30 by any conventional means.

Contact of the mordant solution with the sheet stock is maintained for a time period which is sufficient to permit the formation of a stratum of said mordant at least adjacent the surface of the layer so treated. This contact of the mordant solution with the layer is usually carried out for about from one to several minutes at room temperature or higher. Following imbibition of the mordant in the sheet stock, excess liquid on the surface of the stock is removed by conventional means. A dichroic dye solution may be applied onto the surface of the mordanted and oriented sheet stock immediately after the incorporation of the mordant therein although, in the usual course of events, the sheet stock will be in a dry condition prior to carrying out subsequent practices of the nature described herein for effecting the dyeing of the stock.

The quantity of a basic nylon distributable in a plastic sheet by a so-called imbibition practice such as that just described is, for a variety of reasons, somewhat limited. Considerably higher concentration of a basic mordant in plastic sheet may be obtained by including the mordant in the composition from which the sheet is cast as by the procedure set forth in the example which follows. However, regardless of how the mordant is associated with the plastic sheet stock, it may be stated that even a low concentration thereof is effective in carrying out the aims and objects of this invention.

*Example II*

A 10% solution of polyvinyl alcohol is provided by dissolving an appropriate quantity of polyvinyl alcohol in water. The polyvinyl alcohol solution is heated at about 95° F. until it becomes homogeneous and to the hot solution there is added an appropriate quantity of one of the basic nylons of this invention in a suitable solvent to provide a concentration of the basic nylon mordant of from about 1% to 10% in sheet which is cast from this composition. The solvent liquid for basic nylon is of the character previously described, as for example, a weak acid solution of acetic or formic acid. This mixture is suitably stirred until thoroughly mixed and is heated for from 5 to 20 hours at about 95° F. or until all air in the mixture has been driven out, following which the mixture of polyvinyl alcohol and the polymeric mordant is cast by conventional practices to provide sheet products. The cast sheet is then subjected to stretching to orient the molecules thereof to a desired degree and is laminated to a support such as the support 33 of the film stock 30 to provide a dyeable product.

The mordant concentration obtainable in plastic sheet stock will depend upon a number of factors, such for example, as the compatibility of the mordant with the plastic of the sheet, the molecule size of the mordant, the manner in which the mordant is incorporated in the plastic sheet, i.e., by imbibition or by inclusion in the casting composition, and by other related factors. The higher mordant concentrations are preferred and in this regard plastic sheet in which the mordant has a concentration of about 7% may be mentioned as a generally acceptable all purpose figure in connection with the basic nylon mordants of this invention.

Benefits which accrue from the use of dye mordants in dyeing processes are well illustrated in connection with the printing of dichroic dye images in molecularly oriented sheet materials which contain such a mordant. In this regard, the mordant assists in image formation in the oriented plastic sheet by effecting a more rapid dye transfer from printing matrices contacted with the sheet, as well as a more complete dye transfer from the matrices and lead to the formation of transfer images which faithfully reproduce the resolution of the matrix image and which possess high dye densities. In addition, the incorporated dye mordant assists in improving the wash fastness of the dye in the oriented layer.

Organic compounds, such for example as the basic nylon mordants of this invention, are recognized as being electron donors and are intended herein for employment with dichroic dyes which are in general provided by that class of dyes known as direct cotton dyes. Useful dichroic dyes include acid residues in their molecular structure, as for example a sulfonic acid group or a phenolic group. Dichroic dye compounds of this nature are recognized as being electron acceptors. The mechanism by which basic nylon mordants are able to fix or hold fast dichroic dyes in molecularly oriented layers is not clearly understood but is believed to be the result of a salt-forming reaction wherein one or more amino groups of the mordant react with an acid residue of the dye.

Transfer printing is carried out with the film stock in a wetted condition whereby to assure good overall contact between the surface being printed and the relief printing matrix pressed thereon. Such wetting of the film stock may be with water. One effect of stretching a plastic sheet, such as polyvinyl alcohol, is to cause the sheet to develop a resistance to dissolution in aqueous solution at given temperature. In general, this decrease in solubility of the plastic material in aqueous solution is a function of the degree of its molecular orientation. Such decrease in the solubility of the plastic material affects the ability of an aqueous solution to permeate a sheet of the same and, at least to some extent, affects the printing in the sheet by dye transfer processes of light-polarizing images formed of dichroic dyes. In instances where a mordant is insufficient to overcome these undesired conditions in highly molecularly oriented plastic sheeting of the character with which this invention is concerned, it becomes desirable to prewet the sheet with suitable reagents in aqueous solution.

Preconditioning of this nature is carried out by contacting the film stock with a solution of a reagent or reagents which precondition the stock to increase its receptivity to dye and improve the dyeing qualities thereof in general. A generally useful prewetting solution of this nature comprises an aqueous solution of sodium benzoate and sodium sulfate wherein the sodium benzoate has a concentration of 1% and the sodium sulfate of 4%. Application of a prewetting solution is carried out by dipping the sheet therein for a period of from a few seconds to one or two minutes after which excess solution is removed from the surface to be printed preparatory to application of the printing matrices. Other prewetting solutions are disclosed in the copending joint applications of William H. Ryan and Vivian K. Walworth, Serial Nos. 431,341 and 431,396, filed May 21, 1954. Following the just described prewetting treatment, the film stock is printed by the application of the printing relief matrices thereto.

A dye density of 2.7 and an image resolution of 60 lines per millimeter are considered as acceptable in the commercial production of dye image-bearing products such as motion picture and other types of prints. Similar dye density is commercially acceptable in the production of overall dichroic dye polarizing sheet materials. Dye density and image resolution of this and even higher order have been achieved by the use of the basic nylon mordants of the character described herein when molecularly oriented sheet stock, such as polyvinyl alcohol and in which such a mordant is incorporated, has been printed with the aid of washoff relief matrices to provide dichroic dye images therein.

In general, direct cotton dyes of an essentially elongated structure may be named as suitable for forming light-polarizing images inmolecularly oriented plastic materials, and especially molecularly oriented polyvinyl alcohol. Dyes of this nature are set forth in the previously mentioned patents and, as specific examples thereof, mention may be made of Niagara Sky Blue 6B (C.I. 518) and Niagara Sky Blue (C.I. 520) for cyan; Solantine Red 8BL (C.I. 278), Solantine Pink 4BL (C.I. 353) for magenta; and Solantine Yellow 4GL (Prototype 53) and Stilbene Yellow 3GA (C.I. 622) for yellow.

Throughout the specification and claims, reference has been made to orientable, linear, high molecular weight, hydroxyl-containing, vinyl polymers and specifically to polyvinyl alcohol. Such reference will be understood to include polymers which have not been completely hydrolyzed, as for example partially hydrolyzed polyvinyl acetate, and is further intended to embrace polymers which may or may not have been subjected to stabilization by treatment with boric acid or other cross-linking agent, provided the polymeric material exhibits essentially the properties recognized by those skilled in the art as characteristic of commercially available alcohol.

Since certain changes may be made in the above products without departing from the scope of the invention herein involved, it is intended that all matter contained in the above description or shown in the accompanying drawing shall be interpreted as illustrative and not in a limiting sense.

What is claimed is:

1. A light-polarizing film material of improved light-polarizing properties including a transparent base layer having a high order of dimensional stability, and at least a layer superimposed thereupon having its molecules substantially oriented in a given direction, said superimposed layer comprising a transparent, high molecular weight, hydroxyl-containing, vinyl polymer, at least a dichroic direct cotton dye, and a dye mordant in the form of an organic compound comprising a basic nitrogen-containing polyamide, the molecular orientation of said superimposed layer providing a high axial ratio essential to effective light polarization but thereby also tending to cause a lessened dye receptivity, said dye mordant having an affinity for said dye substantially compensating for said lessened dye receptivity and providing substantial insolubilization of said dye, the coaction of said vinyl polymer, said dye and said dye mordant providing a dye density in said film material which is appreciably higher than that of a light-polarizing film material comprising a similar vinyl polymer and dye, but which is devoid of said dye mordant.

2. A light-polarizing film material as defined in claim 1 wherein said polyamide contains at least one member selected from the class consisting of secondary and tertiary amino groups.

3. A light-polarizing film material as defined in claim 2 wherein said polyamide is the polymerization product of hexamethylene pentamethylene triamine and sebacic acid.

4. A light-polarizing film material as defined in claim 2 wherein said polyamide is a polymer derived by reacting tetraethylene pentamine and sebacic acid.

5. A light-polarizing film material as defined in claim 2 wherein said polyamide is a polymer derived from reacting diethylene triamine and sebacic acid.

6. A light-polarizing film material as defined in claim 2 wherein said polyamide is a polymer derived from reacting 1,2-bis-ω-aminohexyl-aminoethane and adipic acid.

7. A light-polarizing film material as defined in claim 2 wherein said polyamide is a polymer derived from reacting adipic acid and equal parts of hexamethylene diamine and diethylene triamine.

8. A light-polarizing film material as defined in claim 1 having two layers similar to said molecularly oriented layer, each comprising said hydroxyl-containing vinyl polymer, dye, and dye mordant, the molecular orientation of one of said layers being substantially at 90° to that of the other, said layers being bonded to opposite faces of a transparent supporting layer and said dye being printed in the form of a pair of stereoscopic images on the exposed surfaces of said molecularly oriented layers, with said stereoscopic images relatively in proper register.

9. A light-polarizing film material as defined in claim 8 wherein each of said pair of stereoscopic images is multicolored and is composed of a plurality of substractive, color-separation images.

10. A light-polarizing film material as defined in claim 1 wherein said dye is distributed differentially throughout the area of the molecularly oriented layer in the form of at least one light-polarizing image.

11. A light-polarizing film material as defined in claim 1 wherein said basic nitrogen-containing polyamide is predominantly concentrated adjacent that surface of the molecularly oriented layer to which said dye has been applied.

12. A light-polarizing film material as defined in claim 1 wherein said basic nitrogen-containing polyamide substantially constitutes a surface stratum of the molecularly oriented layer and provides a surface into which said dye is imbibed.

13. A light-polarizing film material as defined in claim 1 wherein said dye is distributed substantially uniformly throughout the area of the molecularly oriented layer.

14. A light-polarizing film material as defined in claim 1 wherein said hydroxyl-containing vinyl polymer is polyvinyl alcohol.

15. A light-polarizing film material as defined in claim 14 wherein said base layer is composed of cellulose triacetate.

References Cited in the file of this patent

UNITED STATES PATENTS

| | | |
|---|---|---|
| 2,076,131 | Rein | Apr. 6, 1937 |
| 2,267,842 | Schlack | Dec. 30, 1941 |
| 2,274,831 | Hill | Mar. 3, 1942 |
| 2,289,714 | Land | July 14, 1942 |
| 2,302,332 | Leekley | Nov. 17, 1942 |
| 2,346,766 | Land | Apr. 18, 1944 |
| 2,359,833 | Faris | Oct. 10, 1944 |
| 2,397,276 | Land | Mar. 26, 1946 |
| 2,399,027 | Heribert | Apr. 23, 1946 |
| 2,454,515 | Land | Nov. 23, 1948 |
| 2,458,168 | Husek | Jan. 4, 1949 |
| 2,473,403 | Woodward | June 14, 1949 |
| 2,604,817 | Schupp | July 29, 1952 |